(12) United States Patent
Pfaff

(10) Patent No.: US 6,520,607 B2
(45) Date of Patent: Feb. 18, 2003

(54) APPEARANCE ENHANCEMENT COVER FOR LAPTOP COMPUTERS AND METHOD OF APPLYING SAME

(76) Inventor: Raymond Pfaff, 5808 S. 100th Plz., Apt. 1A, Omaha, NE (US) 68127

( * ) Notice: Subject to any disclaimer, the term of this patent is extended or adjusted under 35 U.S.C. 154(b) by 37 days.

(21) Appl. No.: 09/842,593

(22) Filed: Apr. 26, 2001

(65) Prior Publication Data

US 2001/0054861 A1 Dec. 27, 2001

Related U.S. Application Data

(60) Provisional application No. 60/202,219, filed on May 5, 2000.

(51) Int. Cl.[7] ............................................. A47B 97/00
(52) U.S. Cl. .................... 312/204; 312/223.2; 206/457; 40/594; 40/725
(58) Field of Search ................................. 312/204, 237, 312/223.2; 361/724; 40/768, 725, 312, 594, 773; 206/457

(56) References Cited

U.S. PATENT DOCUMENTS

| | | | | | |
|---|---|---|---|---|---|
| 3,575,226 | A | * | 4/1971 | Chapman | 150/28 |
| 4,294,469 | A | * | 10/1981 | Errichiello | 281/29 |
| 4,785,562 | A | * | 11/1988 | Good | 40/642 |
| 5,825,347 | A | * | 10/1998 | Prinson | 348/836 |
| 5,870,282 | A | * | 2/1999 | Andreet et al. | 312/204 |
| 5,941,617 | A | * | 8/1999 | Crane, Jr. et al. | 312/204 |
| 6,052,933 | A | * | 4/2000 | Lytle | 40/594 |
| 6,209,973 | B1 | * | 4/2001 | Steinberg | 312/223.2 |
| 2001/0054861 | A1 | * | 12/2001 | Pfaff | 312/204 |

FOREIGN PATENT DOCUMENTS

DE 4006053 a1 * 8/1991

* cited by examiner

*Primary Examiner*—Lanna Mai
*Assistant Examiner*—Jerry A. Anderson
(74) *Attorney, Agent, or Firm*—Adam H. Jacobs

(57) ABSTRACT

A laptop computer appearance enhancement device for enhancing the appearance of a laptop computer lid includes at least one generally planar appearance enhancement applique having a generally flat lower surface and adhesive such as glue or the like applicable to one of the lower surface of the applique and a laptop computer lid for removably securing the applique to a laptop computer lid. A centering and aligning device having a generally planar top wall and at least one downwardly depending side wall mounted on the top wall adjacent an edge thereof further includes an applique application opening formed in the top wall of the centering and aligning device, the opening having dimensions approximately equal to the size of the applique. The centering and aligning device is operative to fit onto and over a laptop computer lid with the top wall adjacent thereto and the at least one side wall adjacent to and in contact with a side of a laptop computer such that the applique application opening of the centering and aligning device is positioned to align the appearance enhancement applique on a laptop computer lid, the applique then being adhered to the laptop computer lid to enhance the appearance thereof.

6 Claims, 2 Drawing Sheets

APPEARANCE ENHANCEMENT COVER FOR LAPTOP COMPUTERS AND METHOD OF APPLYING SAME

This application claims the benefit of provisional application No. 60/202,219, filed May 5, 2000.

BACKGROUND OF THE INVENTION

1. Technical Field

The present invention relates to covers for laptop computers and, more particularly, to an appearance enhancement cover for laptop computers and method of applying same which includes a decorative decal or sticker for application to the top surface of the lid of a laptop computer and a centering device to permit the decal or sticker to be centered on the laptop lid in a quick and efficient manner.

2. Description of the Prior Art

Laptop computers have become an integral part of our everyday lives, with computers being used by students, business people and many other individuals. The vast majority of laptop computers are of the same general design including a base section which includes the keyboard, motherboard and other computer peripherals, and a lid section hingedly attached to the base which includes the computer screen. The cases of the laptop computers are generally a uniform gray or black color which tends to make the laptop computers visually indistinguishable from one another. There is therefore a need for a relatively simple device and method by which a laptop computer may be personalized or may be used to exhibit a company logo or the like.

Often times, when an individual is using the laptop computer, the top surface of the laptop computer lid is facing away from the person and thus is viewed by people sitting adjacent to and across from the individual using the laptop computer. This lid surface is an ideal location for the display of a personalized design or company logo or the like as the design or logo will be viewed by other persons. Furthermore, the inclusion of such an identifying design or logo will help to individualize the laptop computer and thus ensure that a case of mistaken identity regarding the laptop computer will not occur, besides making the computer more attractive to other persons. There is therefore a need for an easily applied decal or sticker which will personalize the lid of the laptop computer.

One of the major problems found in the application of such a decal or sticker to the laptop computer lid is the centering of the laptop lid decal on the laptop lid. It is very difficult to properly center and align a large decal or sticker on the laptop lid without an additional centering device or method. There is therefore a need for a centering and aligning device and method for use with the application of the decal or sticker to a laptop computer lid which is simple and effective in use.

Therefore, an object of the present invention is to provide an appearance enhancement cover for laptop computers and a method of applying the same.

Another object of the present invention is to provide an appearance enhancement cover which may be quickly and easily applied and removed from the laptop computer lid without damaging the laptop computer lid surface.

Another object of the present invention is to provide a method and apparatus for applying an appearance enhancement decal or sticker to a laptop computer lid which will properly center and align the decal on the laptop computer lid in a quick and efficient manner.

Finally, an object of the present invention is to provide an appearance enhancement cover for laptop computers and method of applying the same which is simple and efficient in use and cost-effective and durable in manufacture.

SUMMARY OF THE INVENTION

The present invention provides a laptop computer appearance enhancement device for enhancing the appearance of a laptop computer lid which includes at least one generally planar appearance enhancement applique having a generally flat lower surface and adhesive such as glue or the like applicable to one of the lower surface of the applique and a laptop computer lid for removably securing the applique to a laptop computer lid. A centering and aligning device having a generally planar top wall and at least one downwardly depending side wall mounted on the top wall adjacent an edge thereof further includes an applique application opening formed in the top wall of the centering and aligning device, the opening having dimensions approximately equal to the size of the applique. The centering and aligning device is operative to fit onto and over a laptop computer lid with the top wall adjacent thereto and the at least one side wall adjacent to and in contact with a side of a laptop computer such that the applique application opening of the centering and aligning device is positioned to align the appearance enhancement applique on a laptop computer lid.

The present invention also contemplates a method of applying an appearance enhancement applique to the lid of a laptop computer which includes the steps of providing at least one generally planar appearance enhancement applique having a generally flat lower surface and a centering and aligning device having a generally planar top wall and at least one downwardly depending side wall mounted on the top wall adjacent an edge thereof, the centering and aligning device further including an applique application opening formed in the top wall of the centering and aligning device, the opening having dimensions approximately equal to the size of the at least one applique. The centering and aligning device is then positioned on a laptop computer lid with the top wall of the centering and aligning device generally parallel and in contact with the laptop computer lid and the at least one side wall is adjacent to and contacting a side of a laptop computer such that the applique application opening is positioned over and above the laptop computer lid in the desired applique application location. The at least one applique is then placed in the applique application opening on a laptop computer lid such that the at least one applique is contacting a laptop computer lid and the adhesive means releasably adheres the at least one applique on a laptop computer lid thereby enhancing the appearance of the laptop computer.

It is thus seen that the present invention provides a substantial improvement over those inventions found in the prior art. For example, until now it was impractical to apply large stickers and decals to the lid of the laptop as it was nearly impossible to properly center the decal on the lid, and therefore persons desiring to personalize their laptop computers were limited in what could be applied. Furthermore, as the present invention is relatively simple in practice, virtually anyone will be able to personalize their laptop computer in a rapid and efficient manner, and one could change the decal or sticker according to their whim without requiring major effort. Finally, because the centering and aligning device quickly, accurately and easily fits over the laptop computer lid, the applique can be applied to the lid in a short amount of time, which is valuable for all users of the invention, particularly business users. The present invention thus provides a substantial improvement over the prior art.

DESCRIPTION OF THE PREFERRED EMBODIMENT

Figure 1:
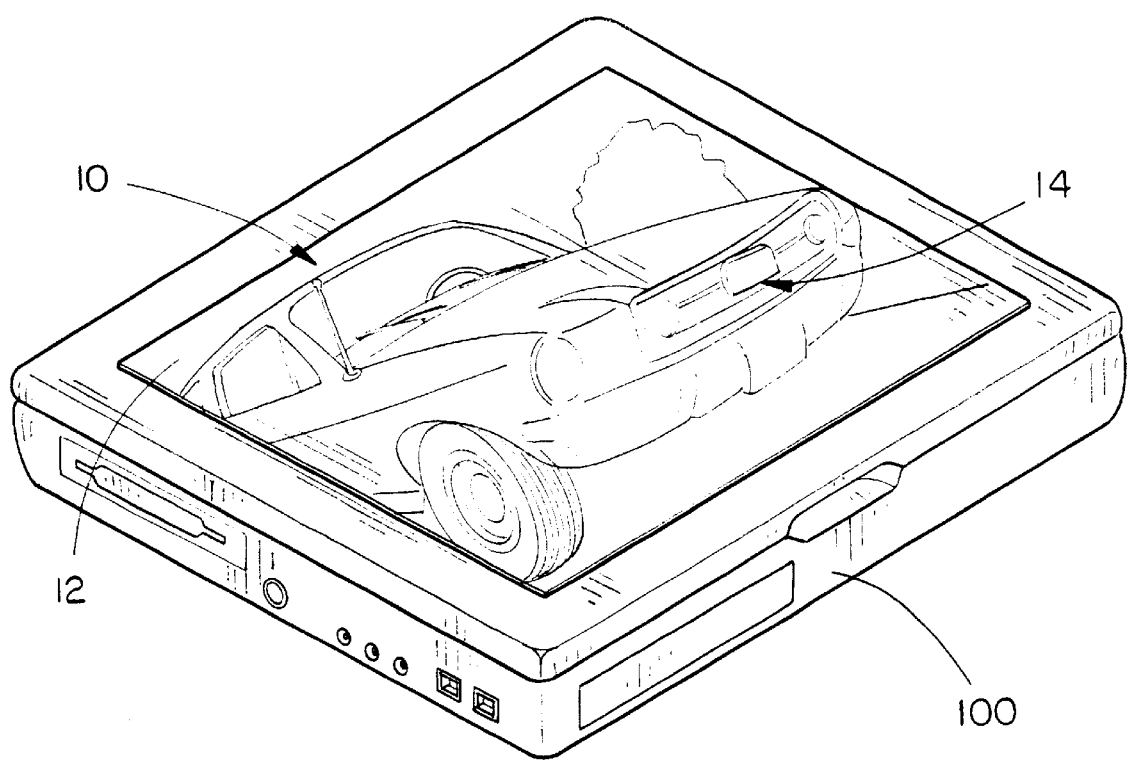
FIG. 1 is a perspective view of the appearance enhancement cover of the present invention applied to the lid of a laptop computer.
Figure 2:
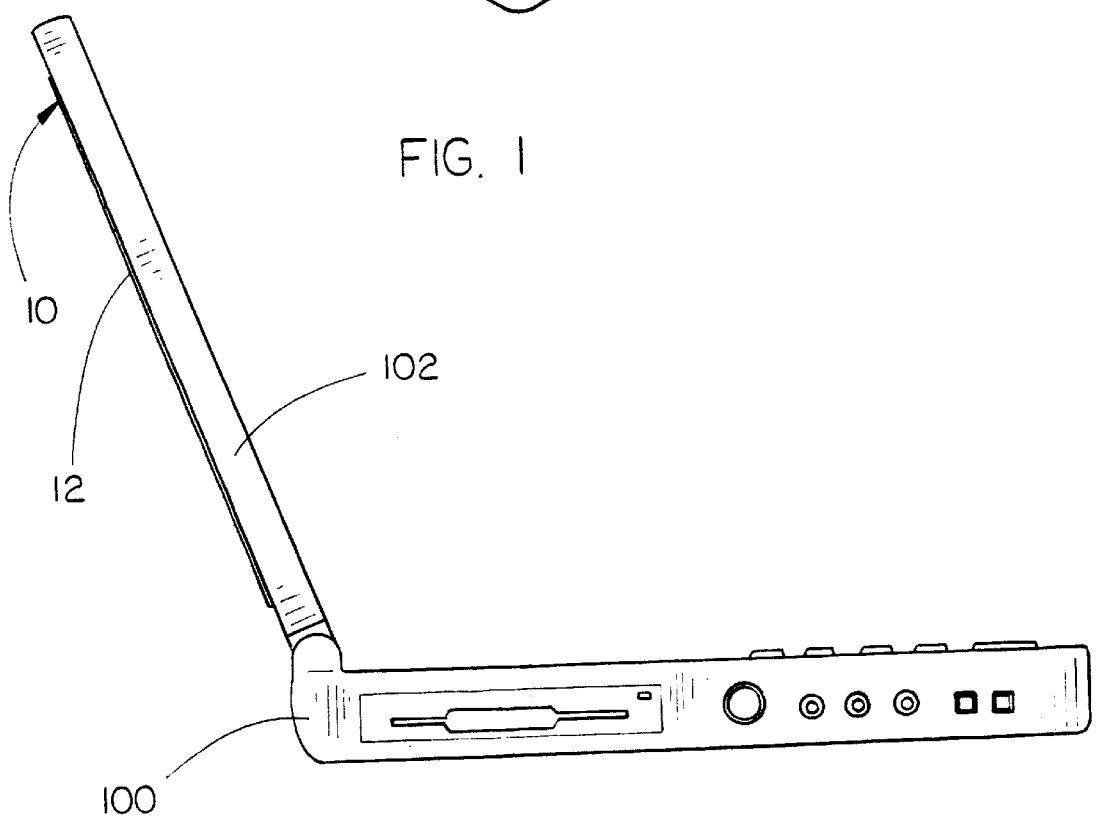
FIG. 2 is a side elevational view of the appearance enhancement cover of the present invention mounted on the lid of a laptop computer.

The appearance enhancement cover 10 of the present invention is best shown in FIGS. 1 and 2 as consisting of a flexible plastic decal or sticker having a design imprinted on the top surface thereof. Such decals and stickers are also generally referred to as "appliques" for purposes of this disclosure, and such should be noted by readers of this disclosure. In the preferred embodiment, the cover 10 would be constructed of a thin yet durable plastic having a thickness between 0.1 and 1 millimeter which permits the cover 10 to be flexible yet durable. As was previously stated, the upper surface 12 of cover 10 would be imprinted with a design 14 which would selected from a virtually unlimited variety of designs, any or all of which would enhance the appearance of the laptop computer 100 to which the cover 10 of the present invention is being affixed. Examples of such designs would include photographs of landscapes, people, pets, reproductions of various art works, and other patterns and designs, depending upon the personal likes and dislikes of the user of the present invention. Of course, it is to be understood that the design 14 may be applied to cover 10 by any of the various methods by which design transfer and imprinting may be done, all of which are known in the prior art and would be usable by one skilled in the art.

The lower surface 16 of cover 10 would include an adhesive substance 18 which is applied over the lower surface 16 and which, in the preferred embodiment, would consist of a glue substance which will not leave a residue on the lid 102 of the laptop computer 100 if and when the cover 10 of the present invention is removed from the lid 102. There are numerous commercially available adhesive substances which satisfy this requirement and could be used as the adhesive 18 of the present invention, the precise nature of which would be known to one skilled in the art of adhesive substances. In the preferred embodiment, the cover 10 would include a backing sheet 19 which would cover and protect the adhesive 18 and would be removed immediately prior to the affixing of cover 10 on laptop 100.

Figure 3:
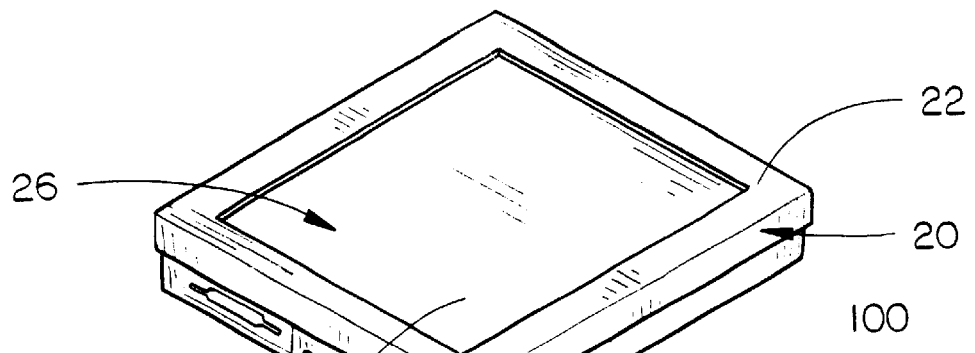
FIGS. 3, 4 and 5 illustrate the method of applying the decal of the present invention to the lid of the laptop computer.
Figure 4:
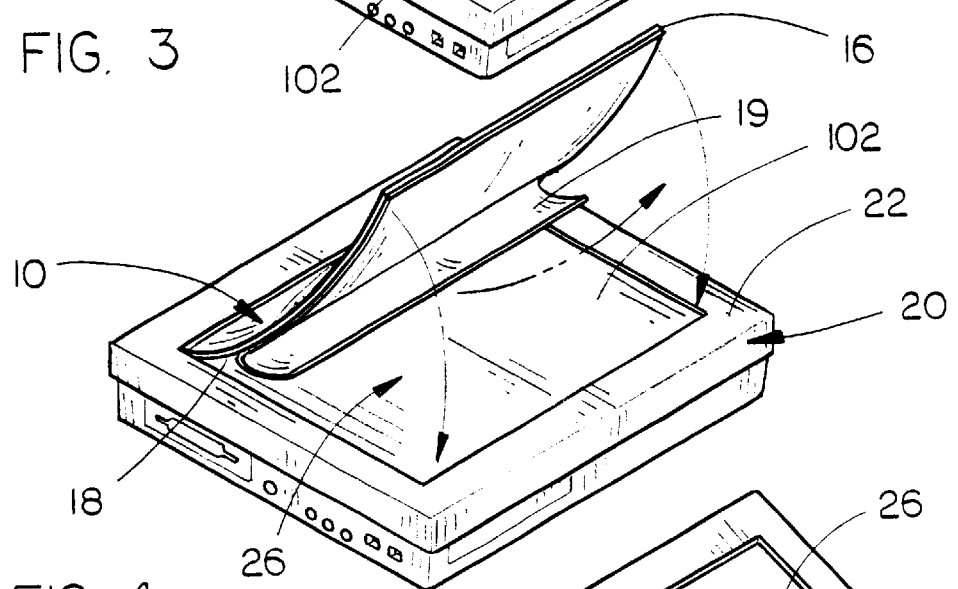
Figure 5:
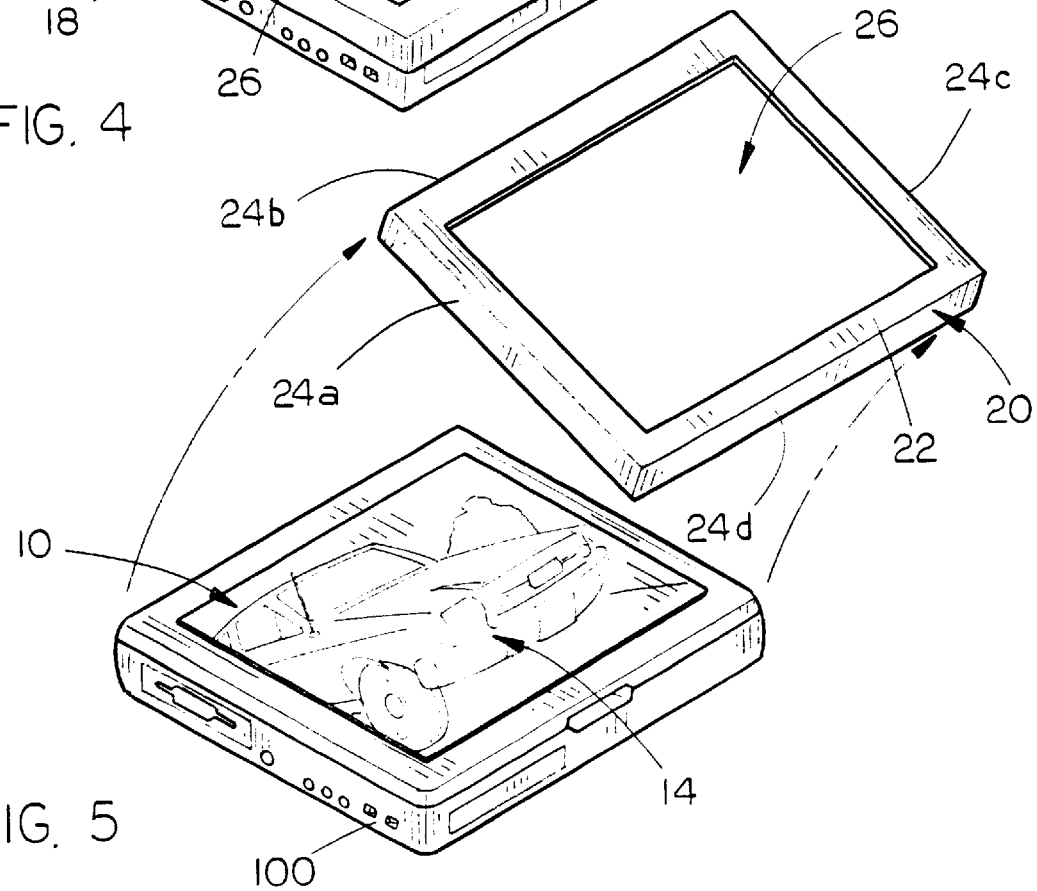

One of the problems encountered in affixing decals to various items is that it is very difficult for individuals to properly center and align the decal on the item being appearance enhanced. The present invention provides a novel and efficient method by which the cover 10 of the present invention would be affixed to the lid 102 of a laptop computer 100, the steps of which are best shown in FIGS. 3, 4 and 5. The method of affixing the cover 10 of the present invention to the lid 102 of laptop computer 100 would include the steps of providing an centering and aligning device 20 which, in the preferred embodiment, would consist of a generally box lid-shaped cardboard or plastic piece having a top face 22 and side walls 24a, 24b, 24c and 24d extending downwards from top wall 22, the centering and aligning device 20 dimensioned to fit snugly over the lid 102 of laptop computer 100 as shown best in FIGS. 3 and 4. Top face 22 of centering and aligning device 20 would further include a generally rectangular cutout applique alignment section 26, the edges of which are aligned parallel with side walls 24a–d as shown in FIG. 3. When applying the cover 10 of the present invention to the lid 102 of laptop computer 100, the centering and aligning device 20 would be fitted over the lid 102 of laptop computer 100 as shown in FIGS. 3 and 4 such that the side walls 24s–d extend downwards over lid 102. Due to the snug fit characteristics of centering and aligning device 20, the cutout section 26 is accurately centered on the lid 102 of laptop computer 100. The user of the present invention would then apply cover 10 to the lid 102 by removing the backing sheet 19 thus exposing the adhesive 18 on lower surface 16 of cover 10. The user of the present invention would then place cover 10 within the cutout section 26 of centering and aligning device 20 as shown in FIG. 5 of the drawings. Because the cutout section 26 is centered on lid 102, cover 10 is likewise centered on lid 102 such that when centering and aligning device 20 is removed from lid 102 of laptop computer 100, the cover 10 remains in place on the lid 102 in an accurately centered position. Of course, numerous other methods for affixing the cover 10 of the present invention to the lid 102 of laptop computer 100 may be used with the present invention, but it has been found that the previously described method of applying the cover 10 results in a consistently excellent product and presentation of the cover 10 on the laptop 100.

It should be noted that as there are various sizes of laptop computers, the exact dimensions of centering and aligning device 20 may be modified to accommodate those various-sized lap computers, but the variations will be small in nature and the modifications will not be difficult to incorporate. It is further preferred that the size and shape of the cover 10 be generally consistent, but that the size and shape of the centering and aligning device 20 would be modified to accommodate the various sizes of laptop computers. In this manner, the decals or covers 10 would be produced in a single size, thus greatly decreasing the cost of production of the present invention. Of course, modifications to the size, shape and design of the cover 10 are well within the broad scope of the present disclosure. It should be further noted that numerous modifications, additions and substitutions to the appearance enhancement cover for laptop computers and method of applying the same of the present invention may be made which likewise fall within the intended broad scope of the present disclosure. For example, the construction material used for the cover 10 and centering and aligning device 20 may be modified so long as the functional characteristics of the devices are not greatly modified. Also, the designs 14 and adhesive material 18 may be modified so long as the functional and appearance characteristics are not degraded. Finally, the method of applying cover 10 to the lid 102 of a laptop computer 100 may be modified and changed so long as the intended result of centering the cover 10 on lid 102 on laptop computer 100 is generally maintained.

There has therefore been shown and described an appearance enhancement cover for laptop computers and method of applying the same which accomplishes at least all of its intended objectives.

I claim:

1. A laptop computer appearance enhancement device for enhancing the appearance of a laptop computer lid comprising:

at least one generally planar appearance enhancement applique having a generally flat lower surface;

adhesive means applicable to one of said lower surface of said at least one applique and a laptop computer lid for removably securing said at least one applique to a laptop computer lid;

a centering and aligning device having a generally planar top wall and at least one downwardly depending side wall mounted on said top wall adjacent an edge thereof;

an applique application opening formed in and extending through said top wall of said centering and aligning device;

said centering and aligning device operative to fit onto and over a laptop computer lid with said top wall adjacent thereto and said at least one side wall adjacent to and in contact with a side of a laptop computer such that said applique application opening of said centering and aligning device is positioned to align said at least one appearance enhancement applique on a laptop computer lid.

2. The laptop computer appearance enhancement device of claim 1 wherein said at least one generally planar appearance enhancement applique comprises a flexible plastic decal or sticker having a design imprinted on the top surface thereof.

3. The laptop computer appearance enhancement device of claim 2 wherein said adhesive means comprises a glue substance applied to said lower surface, said glue substance removably adhering said at least one generally planar appearance enhancement applique on a lid of a laptop computer such that upon removal of said at least one generally planar appearance enhancement applique from a lid, the lid is generally free of glue substance residue.

4. The laptop computer appearance enhancement device of claim 1 wherein said centering and aligning device further comprises a generally box lid-shaped cardboard/plastic piece having at least two side walls extending downwards from said top wall, said centering and aligning device dimensioned to fit snugly over a lid of a laptop computer.

5. The laptop computer appearance enhancement device of claim 1 wherein said applique application opening is dimensioned to be approximately equal to the size of said at least one generally planar appearance enhancement applique whereby said applique fits within and is aligned by said applique application opening for placement on a lid of a laptop computer.

6. A laptop computer appearance enhancement device for enhancing the appearance of a laptop computer lid comprising:

at least one generally planar appearance enhancement applique having a generally flat lower surface;

adhesive means applicable to one of said lower surface of said at least one applique and a laptop computer lid for removably securing said at least one applique to a laptop computer lid;

a centering and aligning device having a generally planar top wall and at least one downwardly depending side wall mounted on said top wall adjacent an edge thereof;

an applique application opening formed in and extending through said top wall of said centering and aligning device, said applique application opening is dimensioned to be approximately equal to the size of said at least one generally planar appearance enhancement applique whereby said applique fits within and is aligned by said applique application opening for placement on a lid of a laptop computer;

said centering and aligning device operative to fit onto and over a laptop computer lid with said top wall adjacent thereto and said at least one side wall adjacent to and in contact with a side of a laptop computer such that said applique application opening of said centering and aligning device is positioned to align said at least one appearance enhancement applique on a laptop computer lid.

* * * * *